United States Patent [19]

James et al.

[11] Patent Number: 4,692,321

[45] Date of Patent: Sep. 8, 1987

[54] OXIDATION OF AMMONIA OVER A MIXED CATALYST BED OF COBALT AND ALUMINUM OXIDES

[75] Inventors: Leonard E. James, Shaker Heights, Ohio; William B. Fisher; Lamberto Crescentini, both of Chester, Va.; Joseph M. Browning, Richmond, Va.

[73] Assignee: Allied Corporation, Morris Township, Morris County, N.J.

[21] Appl. No.: 887,752

[22] Filed: Jul. 21, 1986

Related U.S. Application Data

[60] Division of Ser. No. 456,127, Jan. 6, 1983, abandoned, which is a continuation-in-part of Ser. No. 270,164, Jun. 3, 1981, abandoned.

[51] Int. Cl.$^4$ .............................................. C01B 21/26
[52] U.S. Cl. .................................................... 423/404
[58] Field of Search ........................................ 423/404

[56] References Cited

U.S. PATENT DOCUMENTS

| 1,399,807 | 12/1921 | Scott ................................ | 423/403 |
| 3,962,138 | 6/1976 | Ray et al. ......................... | 423/392 |
| 3,985,681 | 10/1976 | Senes et al. ...................... | 423/404 |

Primary Examiner—John Doll
Assistant Examiner—Wayne A. Langel
Attorney, Agent, or Firm—Richard A. Anderson

[57] ABSTRACT

This invention is a catalyst and method of oxidizing ammonia by contacting the ammonia and air with catalyst of cobalt oxide, wherein the improvement comprises using activated alumina in conjunction with the cobalt oxide catalyst.

2 Claims, No Drawings

OXIDATION OF AMMONIA OVER A MIXED CATALYST BED OF COBALT AND ALUMINUM OXIDES

This application is a division of application Ser. No. 456,127, filed Jan. 6, 1983, abandoned, which in turn is a continuation-in-part of Ser. No. 270,164, filed June 3, 1981, abandoned.

BACKGROUND OF THE INVENTION

This invention relates to the catalytic oxidation of ammonia to oxides of nitrogen, particularly oxidation of ammonia over a mixed catalyst bed of cobalt and aluminum oxide.

The process and catalyst of cobalt oxide mixed with other metal oxides for the oxidation ammonia are known in U.S. Pat. No. 1,919,005 hereby incorporated by reference. Also, mixturs of cobalt oxide with other metals as catalyst in the oxidation of ammonia are known in U.S. Pat. No. 3,985,681, hereby incorporated by reference. The above patents set forth clearly the prior art process and catalysts. However, those operating such processes are continually looking for improved catalysts and yields. The process produces NO and $NO_2$, hereinafter $NO_x$.

Admixtures of metal oxides within individual pellets or co-catalyst is known art, and is believed to utilize complex chemistry that involves interactive or sequential reactions. However, alumina alone is regarded as an inert material under ammonia oxidation conditions. This can be demonstrated by its use either as a catalyst support bed or as a feed-gas preheater layer on top of the colbalt oxide catalyst bed; neither of which give improved yields of $NO_x$.

SUMMARY OF THE INVENTION

The catalyst and process of this invention has substantially increased yields of $NO_x$. The method of the invention is the improvement in oxidizing ammonia by contacting ammonia and air with the catalyst of particles of cobalt oxide, wherein the improvement comprises using particles of activated alumina in conjunction with the cobalt oxide particles. Preferably, about 10 to 50 percent by weight of alumina is used. Both the alumina and the cobalt oxide particles preferably have a particle size of 6 to 14 mesh. Ammonia and air mixtures having an ammonia concentration by volume of 7.5–12 percent are introduced at a space velocity of 15,000 to 100,000 liters of gas per liter of catalyst in a bed of at least 3.75 cm (1.5 inches) deep. The inert gas temperature can be between 25° and 250° C. Upon ignition the bed temperature ranges from 500° C. to 900° C., preferably 600° C. to 850° C. The preferred pressure of the reaction is slightly above atospheric. The catalyst of this invention for oxidizing ammonia by contact with air and ammonia consists essentially of from about 90 to 50 percent by weight of cobalt oxide particles and from about 10 to about 50 percent by weight of alumina particles.

DESCRIPTION OF THE PREFERRED EMBODIMENT

Example

Solid particles of 6–14 mesh of alumina, $Al_2O_3$, and particles of cobalt dioxide, $Co_3O_4$, of the same particle size or larger were placed in a two-inch tubular insulated reactor. Twenty-five ml of alumina particles and 75 ml of cobalt oxide particles were added. Ammonia and air, with the amount of ammonia shown as percent by volume in Table I, were preheated to 80° C. and passed through the reactor at volumetric velocity (VVH) shown. Oxidation proceeded at the upper and lower bed temperature (s) shown for the time shown. The yield in percent by weight of conversion of ammonia to $NO_x$ was measured in the reacted gases at the outlet. Results are shown in Table I.

CONTROL

A control example was run omitting the alumina, but otherwise operating in the same manner. Results are shown in Table II.

DISCUSSION

The tables show by comparing yields of control runs against the runs of the example of the invention that yields are improved substantially at otherwise comparable operating conditions.

Surprisingly, we have found that a uniform physical mixture of catalyst ($Co_3O_4$) and inert ($Al_2O_3$) pellets, as separate particles, lowers the operating temperature of the catalyst bed and provides a substantial improvement in $NO_x$ yield. This is especially important at ammonia in air concentrations above 7.5 percent, where the increase in adiabatic catalyst bed exit temperatures normally results in decreasing $NO_x$ yields as an economic trade-off with higher throughput capacity.

It is postulated that the temperature at the actual pore surface of each $Co_3O_4$ catalyst particle, where reaction is actually taking place, is much higher than that of the gas stream with which it is in contact. There are then simultaneous transfers occuring through the gas/solid interface film: mass transfer of ammonia and oxygen to the catalyst surface and $NO_x$ back into the gas stream, accompanied by heat transfer of the heat of reaction from the catalyst pellet to the gas stream. Intimate physical contact of the $Co_3O_4$ catalyst pellets with inert $Al_2O_3$ pellets, allows another path for heat transfer via conduction into the alumina and thence into the gas stream, thus lowering the equilibrium temperature of each catalyst particle, providing improved yield to $NO_x$. A synergistic benefit is evident, in that higher yields reduce the by-product losses to nitrogen—a very high heat release reaction, which reduces the total quantity of heat generated and further reduces the temperature differential created between the catalyst pore surface and the gas stream. The large difference in bed temperatures between Table II and Table I is due to use of the inert alumina as a heat-sink. Table III shows the temperture differences.

TABLE I

EXAMPLE (25 ml Activated Alumina - 75 ml $Co_3O_4$)

| Run No. | Volume Velocity Per Hour | % $NH_3$ | Time, Hours | Upper Bed Temperature, °C. | Lower Bed Temperature, °C. | Yield, % |
|---|---|---|---|---|---|---|
| 1 | 40,000 | 11.5 | 4 | 831 | 810 | 90.1 |
|   | 40,000 | 11.5 | 8 | 828 | 808 | 89.9 |
|   | 40,000 | 11.5 | 12 | 832 | 811 | 89.3 |
| 2 | 20,000 | 11.5 | 4 | 717 | 643 | 101.1 |
|   | 20,000 | 11.5 | 8 | 714 | 642 | 96.4 |
|   | 20,000 | 11.5 | 12 | 708 | 639 | 94.0 |
| 3 | 20,000 | 7.5 | 4 | 550 | 494 | 68.1 |
|   | 20,000 | 7.5 | 8 | 550 | 498 | 66.0 |
|   | 20,000 | 7.5 | 12 | 550 | 499 | 63.5 |
| 4 | 20,000 | 9.5 | 4 | 634 | 570 | 86.2 |
|   | 20,000 | 9.5 | 8 | 637 | 570 | 89.3 |

TABLE I-continued

EXAMPLE (25 ml Activated Alumina - 75 ml Co₃O₄)*

| Run No. | Volume Velocity Per Hour | % NH₃ | Time, Hours | Upper Bed Temperature, °C. | Lower Bed Temperature, °C. | Yield, % |
|---|---|---|---|---|---|---|
|   | 20,000 | 9.5 | 12 | 645 | 579 | 89.5 |
| 5 | 40,000 | 9.5 | 4 | 719 | 700 | 95.4 |
|   | 40,000 | 9.5 | 8 | 717 | 699 | 93.4 |
|   | 40,000 | 9.5 | 12 | 730 | 711 | 97.4 |
| 6 | 40,000 | 7.5 | 4 | 620 | 608 | 77.5 |
|   | 40,000 | 7.5 | 8 | 620 | 609 | 73.1 |
|   | 40,000 | 7.5 | 12 | 629 | 616 | 79.0 |

*Volume velocity assuming 75 ml bed volume = ratio of flow rate of gas feed mixture to volume of catalyst in liters.

TABLE II

CONTROL (WITHOUT ALUMINA)

| Run No. | Volume Velocity Per Hour | % NH₃ | Time, Hours | Upper Bed Temperature, °C. | Lower Bed Temperature, °C. | Yield, % |
|---|---|---|---|---|---|---|
| 1 | 40,000 | 11.5 | 4 | 816 | 842 | 79.3 |
|   | 40,000 | 11.5 | 8 | 822 | 857 | 75.5 |
|   | 40,000 | 11.5 | 12 | 834 | 865 | 74.2 |
| 2 | 20,000 | 11.5 | 4 | 740 | 705 | 79.8 |
|   | 20,000 | 11.5 | 8 | 736 | 708 | 74.8 |
|   | 20,000 | 11.5 | 12 | 789 | 749 | 79.1 |
| 3 | 20,000 | 7.5 | 4 | 567 | 540 | 44.5 |
|   | 20,000 | 7.5 | 8 | 568 | 548 | 43.7 |
|   | 20,000 | 7.5 | 12 | 581 | 560 | 48.1 |
| 4 | 20,000 | 9.5 | 4 | 660 | 633 | 70.5 |
|   | 20,000 | 9.5 | 8 | 649 | 629 | 64.1 |
|   | 20,000 | 9.5 | 12 | 674 | 653 | 66.4 |
| 5 | 40,000 | 9.5 | 4 | 558 | 770 | 78.2 |
|   | 40,000 | 9.5 | 8 | 722 | 769 | 74.8 |
|   | 40,000 | 9.5 | 12 | 722 | 760 | 73.1 |
| 6 | 40,000 | 7.5 | 4 | 208 | 635 | 64.1 |
|   | 40,000 | 7.5 | 8 | 260 | 638 | 65.5 |
|   | 40,000 | 7.5 | 12 | 214 | 633 | 62.1 |

TABLE III

| Run No. | Lower Bed Temperatures, °C. | | | | Upper Bed Temperatures, °C. | | | |
|---|---|---|---|---|---|---|---|---|
|   | Table II | − Table I = | ΔT | Average ΔT | Table II | − Table I = | ΔT | Average ΔT |
| 1 | 842 | 810 | 32 | 45 | 816 | 831 | −15 | −6 |
|   | 857 | 808 | 49 |    | 822 | 828 | −6 |    |
|   | 865 | 811 | 54 |    | 834 | 832 | 2 |    |
| 2 | 705 | 643 | 62 | 79 | 740 | 717 | 23 | 42 |
|   | 708 | 642 | 66 |    | 736 | 714 | 22 |    |
|   | 749 | 639 | 110 |   | 789 | 708 | 81 |    |
| 3 | 540 | 494 | 46 | 65 | 567 | 550 | 17 | 22 |
|   | 548 | 498 | 59 |    | 568 | 550 | 18 |    |
|   | 560 | 499 | 74 |    | 581 | 550 | 31 |    |
| 4 | 633 | 570 | 63 | 65 | 650 | 634 | 26 | 22 |
|   | 629 | 570 | 59 |    | 649 | 637 | 12 |    |
|   | 653 | 579 | 74 |    | 674 | 645 | 29 |    |
| 5 | 770 | 700 | 70 | 63 | 558 | 719 | −161 | −54 |
|   | 769 | 699 | 70 |    | 722 | 717 | 5 |    |
|   | 760 | 711 | 49 |    | 722 | 730 | −8 |    |
| 6 | 635 | 608 | 27 | 24 | 208 | 620 | −412 | −395 |
|   | 638 | 609 | 29 |    | 260 | 620 | −360 |    |
|   | 633 | 616 | 17 |    | 214 | 629 | −415 |    |

Note the upper bed temperatures at 40,000 (VVH) velocity in Table II, runs 1, 5 and 6, appear to have inordinately low temperatures due to movement of the reaction zone into the bed and away from the normal surface location where the thermocouple had been placed.

We claim:

1. In a method of oxidizing ammonia by contacting ammonia and air with a catalyst of cobalt oxide, the improvement comprising using separate particles of activated alumina in conjunction with the separate particles of cobalt oxide catalyst and wherein about 10 to about 50 percent by weight alumina is added and the catalyst particle size is 6 to 14 mesh, the ammonia and air mixture has an ammonia concentration by volume of 7.5 to 12 percent introduced at a space velocity of from between about 15,000 to 100,000 liters of gas per liter of catalyst bed, the inlet gas temperature is from between about 25° C. to 250° C. and upon ignition the bed temperature ranges from 500° C. to 900° C.

2. The method of claim 1 wherein the bed temperature is between 600° C. and 850° C.

* * * * *